July 4, 1967 A. R. BRAUN 3,329,320
PIVOTALLY MOUNTED, AXIALLY RECIPROCABLE, ACTUATOR-BUTTON
FOR AEROSOL VALVE
Filed Aug. 9, 1965 2 Sheets-Sheet 1

INVENTOR
Arthur R. Braun
BY Dominik & Stein
ATTORNEYS

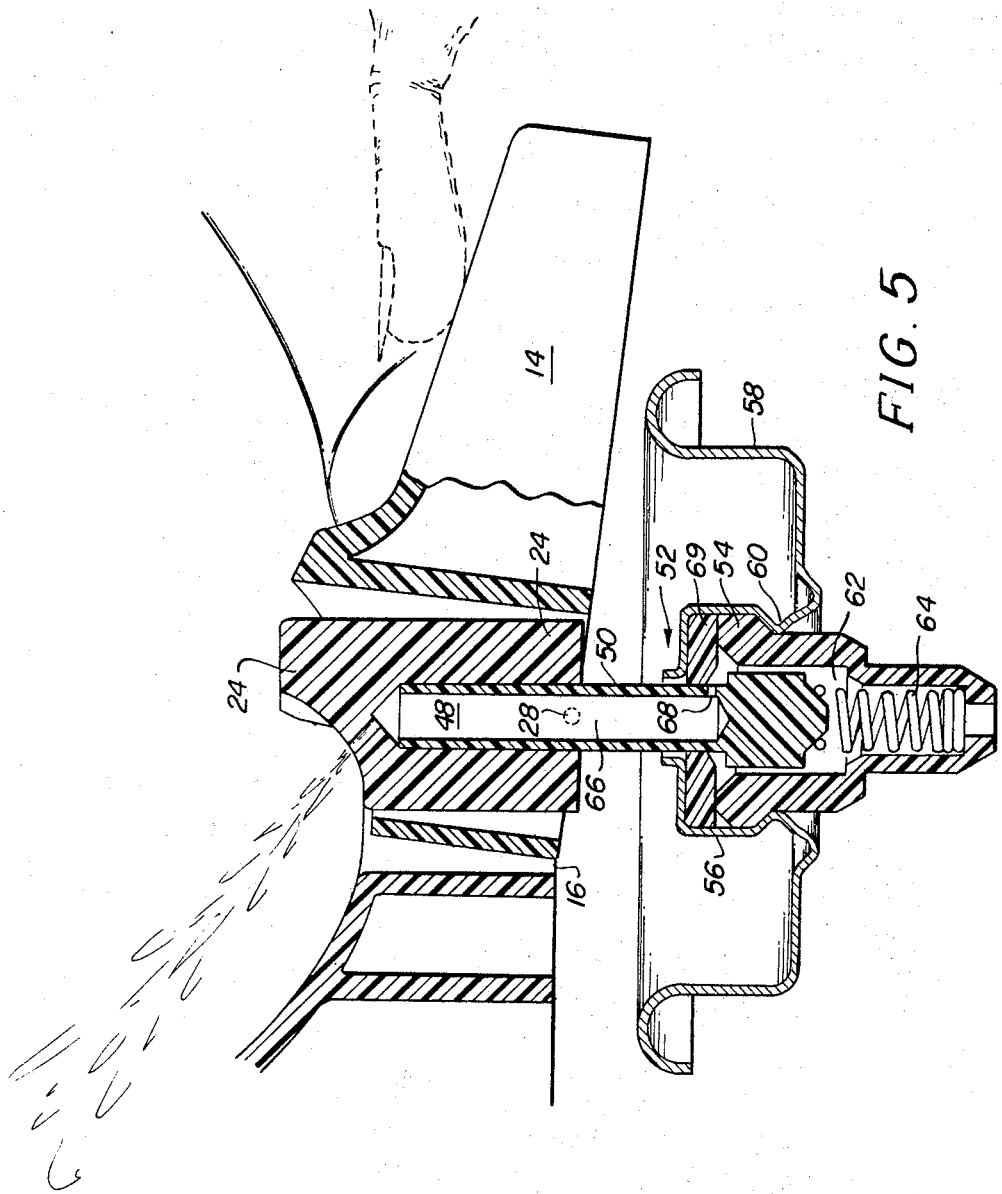

United States Patent Office 3,329,320
Patented July 4, 1967

3,329,320
PIVOTALLY MOUNTED, AXIALLY RECIPRO-
CABLE, ACTUATOR-BUTTON FOR AEROSOL
VALVE
Arthur R. Braun, 209 E. Mildred, Cary, Ill. 60013
Filed Aug. 9, 1965, Ser. No. 478,238
4 Claims. (Cl. 222—402.13)

This invention relates to an actuator for an aerosol valve, and more particularly, to an actuator having a unique lever action as well as a valve button swivel movement whereby the actuating force to open the valve is substantially minimized and leakage is substantially reduced, if not entirely eliminated.

As is well known, aerosol valves generally utilize a spring biased hollow or solid valve stem which extends upwardly out of the valve. This stem must be depressed to cause release of the pressurized product within the can. In the hollow stem type valve, the released product travels through an orifice in the wall of the stem and out through its top. In the solid stem type valve, the released product travels up between the stem and the upwardly extending discharge tube. The actuator is fixed to the valve stem or to the discharge tube.

To properly seal the valve stem, a spring is generally employed under the stem. It supplements the sealing force generated by the pressurized gas within the container against the bottom of the valve. The force of this spring and the pressurized gas is generally quite substantial. It usually requires a considerable force to upset the seal so that the product can be released.

Many actuators for aerosol valves have been devised, but in most instances, they are difficult to operate and, in addition, are generally subject to leakage, upon operation. It has been found that these objectionable characteristics are the result of tilting of the actuator on the valve stem when it is depressed so its movement does not correspond with the vertical axis of the valve stem. The valve stem therefore binds within the valve body and mounting cup and considerable pressure is required to overcome such binding action. Also, the valve stem is generally seated within a cavity formed in the actuator and the tilting of the valve stem and actuator unseats it from the base of the cavity and considerable leakage may occur.

It is therefore an object of the present invention to provide a new and improved actuator.

It is another object of the present invention to provide a new and improved actuator, wherein the actuation pressure necessary to operate, or depress, the valve stem is substantially reduced.

It is another object of the present invention to provide a new and improved actuator, wherein leakage is substantially reduced, if not eliminated.

It is still another object of the present invention to provide a new and improved actuator, wherein the valve stem is moved along the vertical axis of the valve so that binding of the valve stem upon operation is substantially eliminated.

It is still another object of the present invention to provide a new and improved actuator comprising three elements which co-act with one another to minimize the pressure required to operate the valve stem and to substantially eliminate leakage.

It is still another object of the present invention to provide an actuator which, although comprising three elements, may be made by a single molding of plastic.

Other objects of the invention will in part be obvious and will in part appear hereinafter.

The above outlined objectives are accomplished by an actuator structure which generally comprises a vertically disposed tubular wall structure capable of being mounted either upon the outer seam edge or the inner valve housing rim of an aerosol can. Within said tubular wall is a fingerpiece. It may be affixed to a wall via a forwardly extending lever tab not connected directly to the wall. It may also be pivotally mounted thereto. Or it may have other structures enabling depression.

The fingerpiece has a circular cavity formed through it, and a valve button, which is adapted to receive the end of a valve stem. The button is retained within the cavity, by a pair of pivot pins. During operation, the fingerpiece pivots and forces the valve button down, via said pins. Such movement enables the button to move downwardly, in line (axially) with the valve stem. Since the valve stem is not tilted, actuation pressure is minimized and leakage is substantially eliminated. The actuator may be formed from separate elements, or as an integral unit.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 5 is a sectional view of the actuator and an aerosol valve, illustrating the operation of the actuator.

Similar reference characters refer to similar parts throughout the several views of the drawings.

Figure 1:
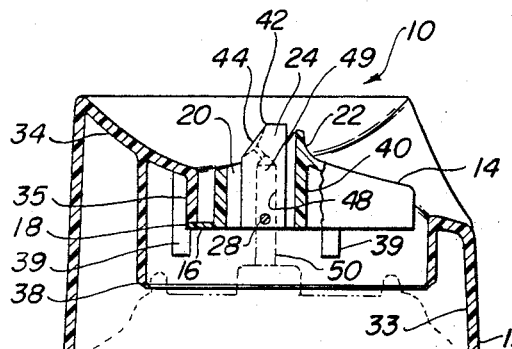
FIGURE 1 is a side sectional view of an actuator, exemplary of the present invention, shown mounted on a valve contained aerosol container.
Figure 2:
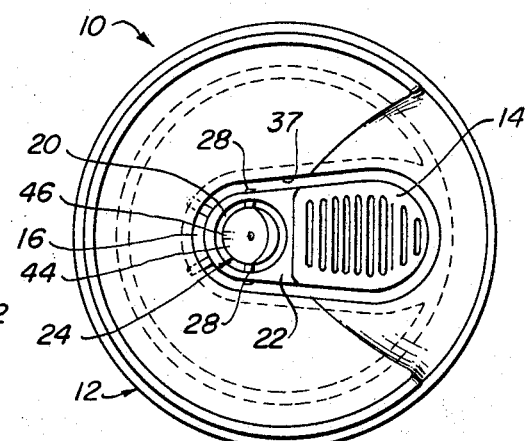
FIGURE 2 is a top view of the actuator of FIG. 1.
Figure 3:
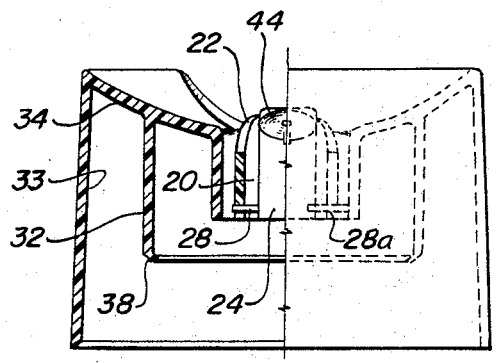
FIGURE 3 is a front, partially sectional view of the actuator of FIG. 1.
Figure 4:
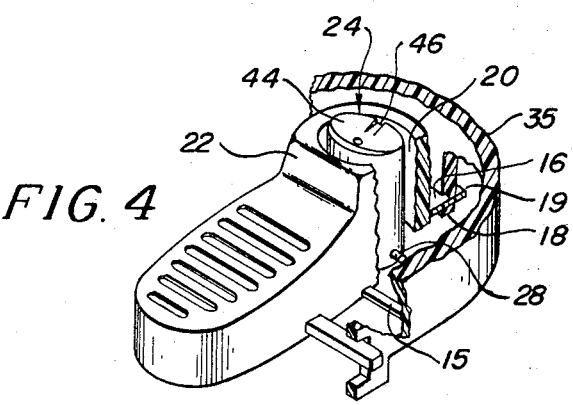
FIGURE 4 is a partial perspective view of the fingerpiece and valve button, illustrating the inter-connection between them.

Referring now to the drawings, the actuator 10 has an upright tubular support wall structure 12 and a fingerpiece 14 which pivots about a horizontal axis such as that provided by lever pivot support surface 18 on the tubular support wall 12. The fingerpiece 14 has a valve button cavity 20 formed therein which extends through its enlarged head portion 22. Within the cavity 20 is located a valve button 24 which is mounted upon the valve stem 50 of an aerosol valve 52 (see FIG. 5). A pair of pins 28 formed either integrally with the fingerpiece or with the button, transmit any depressive force on the fingerpiece to the button, and the button, in turn, depresses the valve stem in a manner described more fully hereinafter.

The tubular support wall structure 12, as shown is a double wall structure consisting of an inner wall 32 and an outer wall 33 coinciding with the wall of the aerosol can, with a bridge 34 connecting the upper end of both walls. It could also be a single wall structure fitting onto the edge of the valve mounting cup 58. The lever pivot support surface 18 is provided by constructing a third inner wall 35 which is preferably arcuate in shape to form a wall 37 therein for the fingerpiece 14. The lower edge of inner wall 35 acts as the lever pivot support surface 18.

If desired, vertical ribs 39 may be formed on the inner wall 32 to provide added strength to the wall. These terminate short of the lower edge of the inner wall and act as stops against the upper surface of the valve mounting cup 58. Inwardly slanted annular anchor lip 38 on the bottom edge of the inner wall 32 provides a snap-fit arrangement whereby the actuator 10 can be easily secured to the valve mounting cup.

With respect to the wall-fingerpiece-button interconnection, it is preferred that they be molded as a one-piece article. In such molding, lever web 19 may connect the wall and the fingerpiece when first molded; however, the web, during use, usually severs, and accordingly, the wall and the fingerpiece act as two separate parts. Likewise, a web may exist around valve button pins 28 but it will usually sever upon use.

Molding of the wall 12, the fingerpiece 14 and the button 24 as a one-piece article, is accomplished by using fingerpiece sprue 15 and pins 28 to fill the cavities which define said elements.

Referring now to the structure of the fingerpiece 14, it may be seen that it comprises an oval-shaped inverted cup structure, with an inner circular-shaped wall 40 (FIG. 1) formed therein. The wall 40 in conjunction with the front wall of the fingerpiece form the cavity 20 in the enlarged head portion 22. If desired, a solid block structure can be utilized and the cavity 20 formed therein, but the hollow inverted cup structure is preferred because it saves material and lightens the weight of the fingerpiece.

The pins 28 are integrally formed with either the fingerpiece 14 or the valve button 24 within the cavity 20, at diametrically opposed positions and perpendicular to the longitudinal axis of the fingerpiece. These pins 28 extend into the cavity 20 and in the preferred form, extend under the fingerpiece wall structure whereby force on the fingerpiece will be transmitted to the valve button, and then to the valve stem of the aerosol valve to depress it. The pins 28 could equally extend into pin cavities on the button for a similar type action.

The valve button 24 can be cylindrical in shape as illustrated, with one side of its top tapered, as at 42. A concave drip eliminating recess 44 is formed in the tapered portion and the lower edge thereof is notched to form a drain trough 46. A valve stem receiving cavity 48 and a smaller terminal orifice 49 which extends from the cavity 48 to the recess 44, is formed centrally within the valve button 24. Pin receiving apertures (not shown) may also be formed at diametrically opposed positions on the lower end of the exterior surface of the valve button 24, for receiving the pins 28 where they have been molded as part of the fingerpiece.

Referring now to FIG. 5 which illustrates the unique bind-free operation accomplished by the actuator 10 of the present invention, the valve stem 50 of an aerosol valve 52 is shown seated within the valve stem receiving cavity 48 formed in the valve button 24. The aerosol valve 52 is of standard design and includes a valve body 54 which is securely retained within a turret 56 of the valve mounting cup 58, by crimping the turret 56, as at 60. The valve stem 50 is seated within a cavity 62 formed within the valve body 54, and is normally biased upwardly by biasing means, which preferably comprises a helical spring 64. In the embodiment shown, the valve stem 50 is of the hollow stem type, having formed therein a valve stem cavity 66 and a release orifice 68, through which the product is released when the valve stem is depressed. Sealing means which generally are in the form of a resilient washer 69, normally seals the orifice 68 to prevent leakage, until the aerosol valve is operated.

In operating the aerosol valve 52, the valve stem 50 is forced downwardly into the cavity 62 until the orifice 68 is clear of the sealing means 69. As discussed above, the presently available actuators, normally tilt the valve stem 50 as it is being depressed so that it binds against the turret 56 and the valve body 54. Also, since the valve stem 50 is tilted, leakage frequently occurs between the valve stem and the valve stem receiving cavity of the actuator.

In FIG. 5, however, it may be noted that the valve stem 50 is not tilted upon actuating the fingerpiece 14, but is forced downwardly in line with the vertical, or common, axis of the valve stem and the valve body. When the fingerpiece 14 is depressed, as illustrated, its lever tab 16 pivots upon the pivot support surface 18. The valve button 24, however, since it is not a part of the fingerpiece 14 but is pivotally secured to the fingerpiece 14 by means of pins 28, remains positioned in line with the common axis of the valve stem 50 and the valve body 54. The pins 28 merely rotate and shift rearwardly along the bottom surface of the fingerpiece. As the pins 28 are positionably displaced downwardly by the pivotal movement of the fingerpiece 14, the pins 28 force the valve button 24, and hence the valve stem 50, vertically downward substantially in line with common axis. Since the valve stem 50 is not tilted, upon being depressed, it does not bind and the actuation pressure required is minimized. Also, for the same reason, the valve stem 50 is not unseated, within the cavity in the valve button, and leakage is eliminated.

It may therefore be noted that with the above described actuator, the lever (fingerpiece 14) functions only as a lever and the valve stem depressor (valve button 24) functions only to depress the valve stem, and a single element lever that performs the dual function, as in the past, is not used.

It may be further noted that while the fingerpiece is described as being pivotally supported by means of a lever tab, it could as well be secured to the tubular wall structure 12 by means of a hinge, a diaphragm, a pivot, a strap or in any other suitable fashion. Also, the pins 28a could be formed as an integral part of the valve button 24 and pin receiving apertures formed in the side walls of the cavity 20 of the fingerpiece, instead of the structure described above.

If, for some reason, it would be desired to attach the valve button 24, to, or to form it as an integral part of, the fingerpiece 14, this can be done by using a link or links of sufficient length and flexibility to permit the valve button 24 its proper range of vertical movement to operate the valve stem.

Also, the fingerpiece 14 and the valve button 24 can be made substantially smaller than illustrated so that the overall size of the actuator is substantially reduced. In such a case, the fingerpiece 14 can be a substantially flat member having only an inner wall 40 which is of sufficient size to support and to actuate the valve button 24, in the manner described above.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. An actuator for an aerosol valve comprising a structure capable of being mounted upon said aerosol valve, said structure having a fingerpiece cavity formed therein, a fingerpiece pivotally supported within said fingerpiece cavity and having a valve button cavity formed therein, a valve button adapted to be secured to a valve stem retained within said valve button cavity by means adapted to both secure said valve button therein and to move said valve button vertically when said fingerpiece is pivoted, and a discharge passage formed in said valve button.

2. An actuator for an aerosol valve comprising an outer tubular wall structure capable of being mounted upon said aerosol valve, said wall structure having a downwardly facing lever support surface and a fingerpiece with a forwardly extending lever tab which extends beneath said surface and pivots about said support surface, a valve button cavity formed in said fingerpiece, a valve button adapted to be secured to a valve stem, a pair of pins integrally formed with said fingerpiece within said valve button cavity, said pins engaging said valve button and moving said valve button vertically when said fingerpiece is pivoted, and a discharge passage formed in said valve button.

3. An actuator for an aerosol valve comprising an outer tubular wall structure capable of being mounted upon said aerosol valve, said wall structure having a fingerpiece cavity formed therein, a fingerpiece pivotally supported within said fingerpiece cavity and having a valve button cavity formed therein, a valve button adapted to be secured to a valve stem, a pair of pins integrally formed with said fingerpiece within said valve button cavity, said pair of pins engaging said valve button and moving said valve button vertically when said fingerpiece is pivoted, and a discharge passage formed in said valve button.

4. An actuator for an aerosol valve comprising an outer tubular wall structure capable of being mounted upon said aerosol valve, said wall structure having a fingerpiece cavity formed therein, a fingerpiece pivotally supported within said fingerpiece cavity and having a valve button cavity formed therein, a valve button adapted to be secured to a valve stem, a pair of pins integrally formed with said valve button within said valve button cavity, said pair of pins engaging said fingerpiece and moving said valve button vertically when said fingerpiece is pivoted, and a discharge passage formed in said valve button.

References Cited

UNITED STATES PATENTS

| | | | |
|---|---|---|---|
| 2,558,272 | 6/1951 | Rubenstein et al. | 222—394 |
| 3,109,565 | 11/1963 | Kutik | 239—337 X |
| 3,138,331 | 6/1964 | Kutik | 222—509 X |
| 3,149,761 | 9/1964 | Harris et al. | 222—394 |
| 3,169,673 | 2/1965 | Focht | 222—182 |
| 3,185,349 | 5/1965 | Sagarin | 222—394 |
| 3,189,232 | 6/1965 | Joffe | 222—394 |
| 3,223,332 | 12/1965 | Nyden | 222—579 X |
| 3,269,614 | 8/1966 | Abplanalp | 222—402.13 |

RAPHAEL M. LUPO, *Primary Examiner.*